E. F. PHILBROOK, Jr.
STAND.
APPLICATION FILED AUG. 25, 1919.
1,343,229.
Patented June 15, 1920.
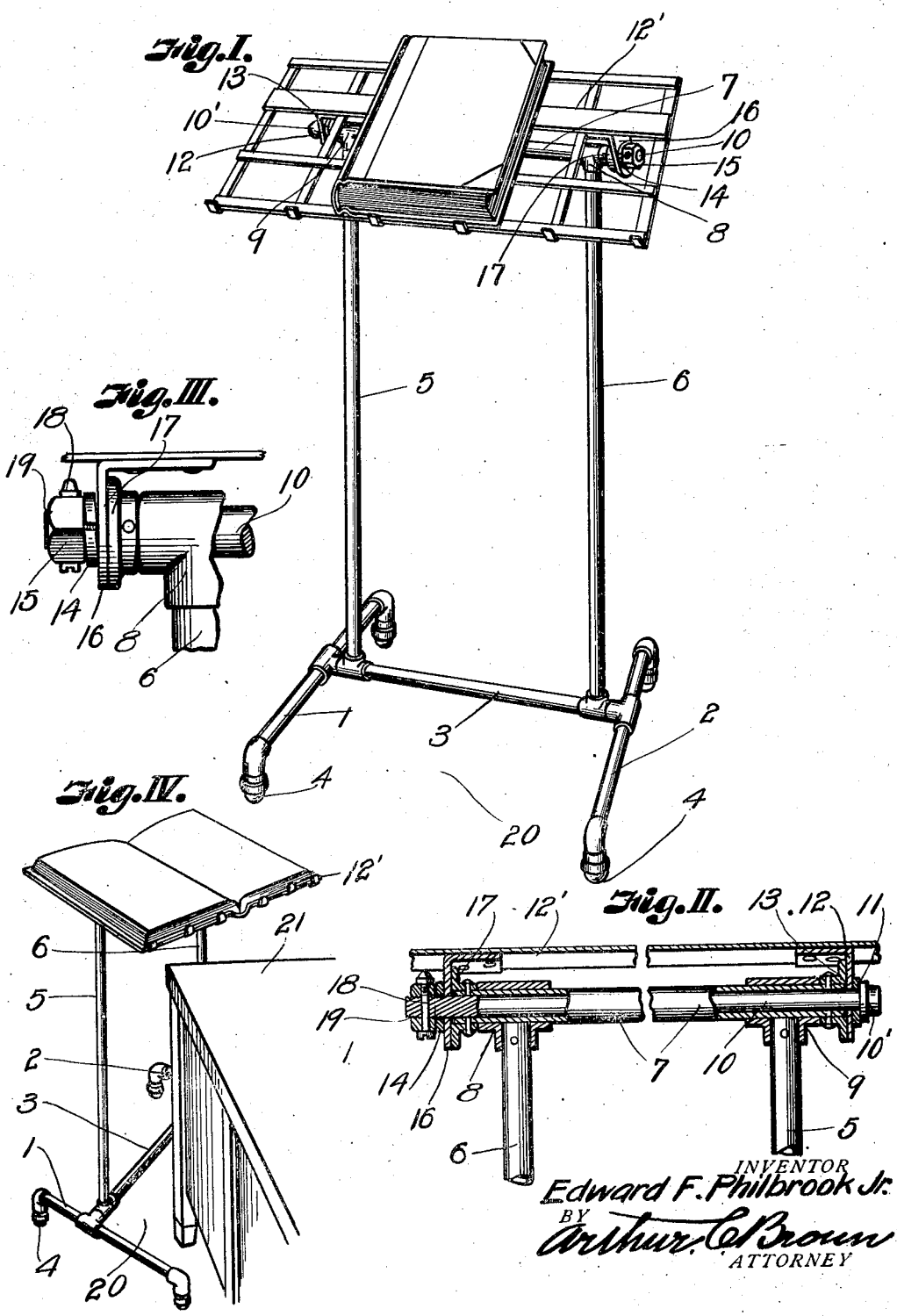

UNITED STATES PATENT OFFICE.

EDWARD F. PHILBROOK, JR., OF KANSAS CITY, MISSOURI.

STAND.

1,343,229.  Specification of Letters Patent.  Patented June 15, 1920.

Application filed August 25, 1919. Serial No. 319,804.

*To all whom it may concern:*

Be it known that I, EDWARD F. PHILBROOK, Jr., a citizen of the United States, residing at Kansas City, in the county of Jackson and State of Missouri, have invented certain new and useful Improvements in Stands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a stand or desk which may be utilized for the purpose of holding books and other articles, the stand being so constructed that it will occupy but little space, that it will be light and easily transportable and provided with a table or rest conveniently adjustable at any angle. The stand is primarily adapted for books but may be used for other purposes, as will be obvious by reference to the drawings in connection with the accompanying description.

In the drawings,

Figure I is a perspective view of a stand constructed in accordance with my invention.

Fig. II is a vertical longitudinal sectional view through the table support.

Fig. III is a fragmentary end view of a friction device to hold the table in any adjusted position, and Fig. IV is a perspective view showing the end of a desk with the stand in position to hold the book over the top of the same.

The base of the stand is shown as consisting of two parallel bars 1 and 2, connected by a cross bar 3 intermediate the ends thereof to provide a broad flat base, the bars 1 and 2 having downwardly projecting extensions receiving casters 4. Extending from the top of the cross bar 3 are two standards 5 and 6, connected to a friction bar 7 by means of the T-shaped sleeve members 8 and 9, the friction bar being hollow and of tubular form to receive a rod 10 extending entirely through the same. The rod 10 is provided with a head 10' and carries a washer 11 to bear against a friction plate 12 fast to the table 12', the friction plate 12 also bearing against a flange 13 fast on the tube 7 and at the other end of the rod 10 is a spring washer 14, interposed between a nut 15, fast on rod 10 and bearing against the friction plate 16, corresponding to the one designated 12, and secured to the table 12', the opposite face of the plate 16 bearing against a flange 17 corresponding to flange 13 at the opposite end. The nut 15 is locked to the rod 10 by a transverse bolt 18, which passes through the rod and the nut, as clearly shown in Fig. II.

When the parts are assembled as shown in Fig. II, the nut 15 will be screwed on the threaded portion 19 of the rod until tension is put on the spring washer 14 and the head 10' of the rod is drawn tight against the washer 11. The spring washer has enough resiliency to put the operating parts under friction so that the table 12' may be swung on the friction plates, which constitute pivot members, at any angle, as will be clearly apparent by reference to Figs. I and II.

If the device is to be used in connection with a desk, the straddle space 20 between the base bars 1 and 2 will permit the bars 1 and 2 to straddle the corner of the desk, as shown in Fig. IV, so that the table can be conveniently positioned above the desk 21.

It will be apparent that the device is adapted to be easily transportable and that the stand table may be swung to any angle. It is also apparent that the device is simple in construction and neat in appearance.

What I claim and desire to secure by Letters-Patent is:

1. In a stand, a base, uprights extending from said base, fixed tubular bearings on said uprights, a tubular shaft in said bearings, flanges on the respective ends of said shaft, a rod extending through the tubular shaft and having a head on one end and a threaded nut on the other, a book support, flat bracket arms on the support and sleeved on the rod, said arms bearing against the flanges on the tubular shaft, and a tension device between one of the arms and the threaded nut.

2. In a stand, a base, uprights extending from said base, fixed tubular bearings on said uprights, a tubular shaft in said bearings, flanges on the respective ends of said shaft, a rod extending through the tubular shaft and having a head on one end and a threaded nut on the other, a book support, flat bracket arms on the support and sleeved on the rod, said arms bearing against the flanges on the tubular shaft, and a tension device comprising a split spring washer between one of the arms and the threaded nut.

3. In a stand, a base, uprights extending from said base, fixed tubular sleeves transversely disposed on said uprights, a tube extending entirely across the base and fast to the sleeves, outwardly projecting flanges fixed to the ends of the tube, a rod loosely extending through the tube and having a head on one end and a threaded nut on the other, a support, flat arms on said support through which the rod projects, and a tension device between the nut and one end of the tube.

In testimony whereof I affix my signature.

EDWARD F. PHILBROOK, Jr.